May 1, 1934.   H. A. PALMER   1,956,586
METHOD OF COMBUSTING FUEL OIL CHARGES FOR OIL BURNING MOTORS
Filed Oct. 1, 1931
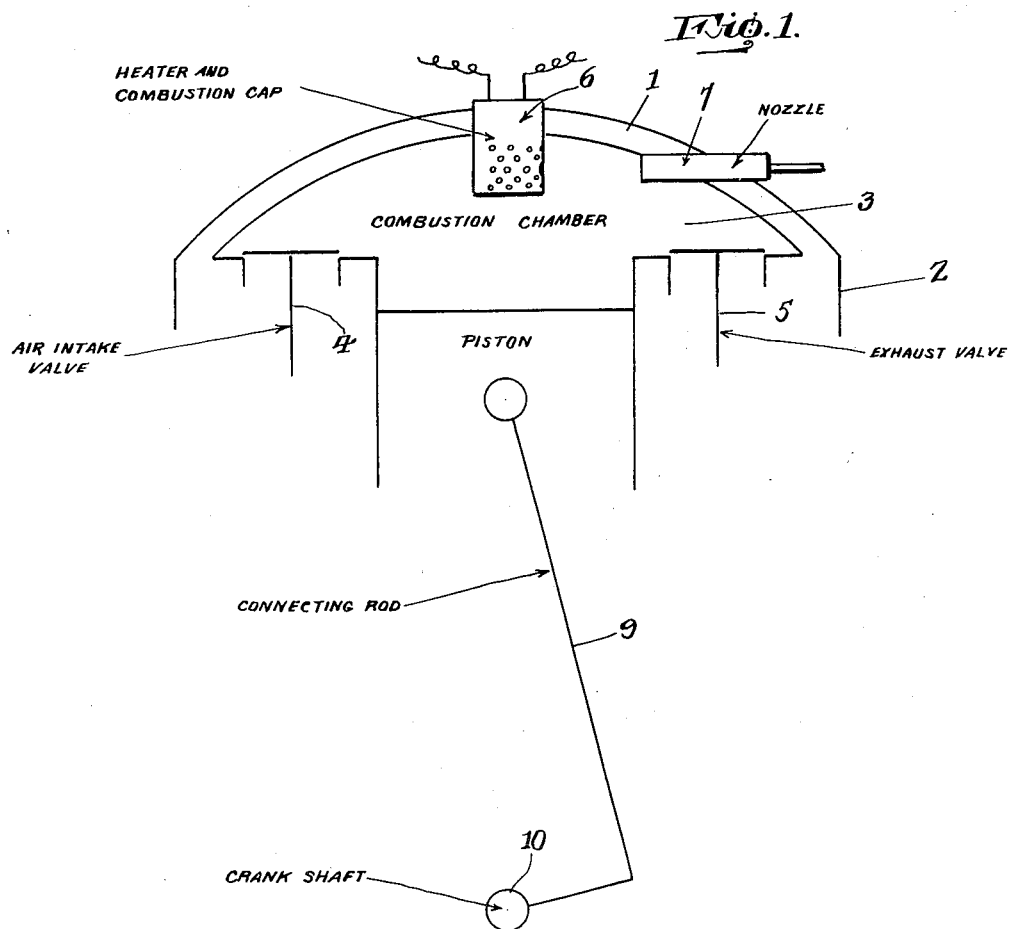
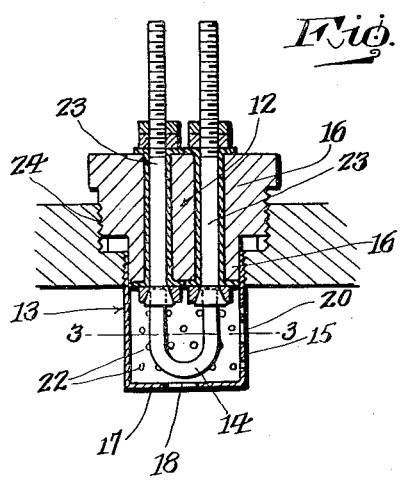
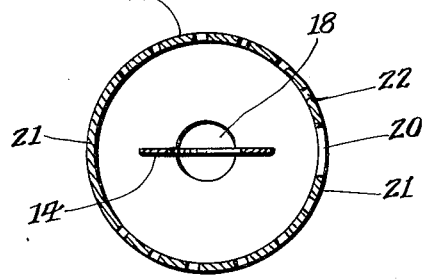
Inventor
Harry A. Palmer
By
Geo. P. Kimmel
Attorney Patented May 1, 1934                                              1,956,586

UNITED STATES PATENT OFFICE 1,956,586

METHOD OF COMBUSTING FUEL OIL CHARGES FOR OIL BURNING MOTORS

Harry A. Palmer, Boston, Mass., assignor to Palmer Inventions, Inc., a corporation of Massachusetts Application October 1, 1931, Serial No. 566,385

1 Claim. (Cl. 123—145)

This invention relates to a method of combusting fuel oil charges for driving the pistons of oil burning motors, and has for its object to provide, in a manner as hereinafter set forth, a method for the purpose referred to whereby a flame is sustained from a previously combusted charge for combusting a subsequent charge resulting in a continuous operation of the piston of the engine.

In carrying out the method, there is extended into the compression chamber of the motor at any desirable point and forwardly of the motor piston, a fuel combuster including an electrical heater providing a primary fuel combusting element and a receptacle forming a combined combustion chamber and a secondary fuel combusting element. Preferably the heater will extend through the cylinder head. The receptacle is to be positioned around that part of the heater within the compression chamber and is formed with an open top and has its body and bottom apertured. The receptacle is arranged in spaced relation throughout with respect to that portion of the heater within the compression chamber. The receptacle is to be secured to and extended from the engine body in a manner whereby the top thereof is closed and further whereby it is arranged in the direction of the path of travel of an ejected charge of oil whereby the latter will pass into the combustion chamber provided by the receptacle and impact the heater. The air necessary for proper combustion will be supplied to the compression chamber from the air intake of the engine.

The charge of oil, the latter being under a low flash point, is injected under a state of compression, not less than sixty pounds per square inch of piston compression into the compression chamber of the engine. Before the initial charge of oil is had, the electrical heater is made active to the desired degree, after which the oil charge is injected and passes into the receptacle to contact with the heater to cause the combustion of the charge. After the initial or the second charge of oil has been combusted, the walls of the combustion chamber provided by the receptacle becomes heated for combustion purposes and the electrical heater is then rendered inactive. When a charge of oil is combusted by the combuster, there is always a film of oil remaining on the walls of the receptacle. This may be termed trapping. When the heater has been rendered inactive, the walls of the combustion chamber, the latter being provided by the receptacle, are heated to the extent to provide for the film of oil trapped to ignite and stay in a burning state for a period, at least long enough to combust the next charge without employing the electrical heater. The oil being injected under a heavy pressure and at extremely high speed, breaks into a very fine spray when striking the receptacle. The receptacle might also be termed a trap, as it does trap the injection of the oil fuel until the charge is combusted.

Although preferably the heater will be turned off and made inactive after the initial charge, yet it is to be understood that the heater may be made inactive after the second or third charge. The heater provides a primary combusting element. The receptacle provides a secondary combusting element and is made initially active from the primary element. The method provides for what may be termed the sustaining from successive charges of fuel oil, a continuous flame surrounding an initially active and subsequent inactive primary heating source to provide for the combusting of such charges.

The drawing illustrates by way of example, one form of a motor construction capable of carrying out the method in accordance with this invention.

In the drawing:

Figure 1 is a diagrammatic view of an oil burning motor.

Figure 2 illustrates by way of example and in vertical section one form of an electrical heater for igniting the combustible fuel.

Figure 3 is a section on line 3—3, Figure 2.

Referring to the drawing, the motor includes a head 1 for the cylinder 2, a compression chamber 3, an air intake valve 4, an exhaust valve 5, a fuel combuster 6 and a fuel injector 7. The means 6 is secured in the head 1, depends into the chamber 3 and is positioned in the path of the fuel, as the latter is discharged from injector 7 through compression chamber 3 into combuster 6. The injector 7 is disposed at right angles to the means 6, is secured in the head 1 and extends into chamber 3. The head 1 as shown is of convexo-concaved cross section. The piston of the motor is indicated at 9, the piston connecting rod at 10, and the crank shaft driven from piston 9 at 11.

The means 6 includes an electrical heater device 12 having a portion thereof encompassed by a receptacle or cap 13 arranged in chamber 3. The device 12 extends into chamber 3 and includes at its inner end a heating element 14 which is surrounded, in spaced relation by receptacle or cap 13. The device 12 forms a primary fuel combusting element and the receptacle or cap a combined secondary fuel combusting element and a combustion chamber.

The cap 13 includes a sleeve like body 15 of the desired length and which is open at its top for encompassing the inner part 16 of the body portion 16' of the device 12. The body 15 has formed integral with its lower end a flat bottom 17 provided with an axially arranged opening 18. The body 15 has that side 19 thereof arranged to oppose, in spaced relation the injector 7. The said side 19 is provided with an opening 20 which aligns with the discharge end of injector 7. That side of body 15 which is opposite the side 19 is imperforate. The body 15, other than the side 21 thereof, is formed with spaced openings 22 of less diameter than the openings 18 and 20. The opening 20 provides for the entrance of the fuel into the cap 13, and the openings 18, 20 and 22 provide for the passage of the flame from cap 13.

The heater device includes a pair of spaced insulated electrodes 23 which extend through body portion 16', are interposed in the heating circuit and have their inner ends connected to the ends of the heating element 14, the latter being of U-form. The body portion 16' is in the form of a threaded, flanged, apertured plug which is secured in the opening 24 formed in head 1.

What I claim is:—

A method of combusting charges of fuel oil in oil burning motors consisting in injecting under compression and in the presence of air a charge of oil in a path extending horizontally across a compression chamber to enter into a combustion chamber within the compression chamber for impacting against an active fuel combuster for the charge within the combustion chamber, simultaneously with the impact of the charge retaining a portion of the latter in film like form within the combustion chamber to sustain a flame, rendering the fuel combuster inactive and then utilizing the sustained flame within the combustion chamber for combusting a subsequent charge of oil injected into the motor in a like manner as the initial charge and retaining a portion of the subsequent charge within the combustion chamber to sustain a flame for combusting a follower charge.

HARRY A. PALMER.